US008576928B2

(12) United States Patent
Allen

(10) Patent No.: US 8,576,928 B2
(45) Date of Patent: Nov. 5, 2013

(54) CAPACITIVE DIVIDER TRANSMISSION SCHEME FOR IMPROVED COMMUNICATIONS ISOLATION

(75) Inventor: Anthony John Allen, Los Gatos, CA (US)

(73) Assignee: Intersil Americas Inc., Milpitas, CA (US)

( * ) Notice: Subject to any disclaimer, the term of this patent is extended or adjusted under 35 U.S.C. 154(b) by 813 days.

(21) Appl. No.: 12/775,517

(22) Filed: May 7, 2010

(65) Prior Publication Data
US 2010/0284452 A1 Nov. 11, 2010

Related U.S. Application Data

(60) Provisional application No. 61/176,800, filed on May 8, 2009.

(51) Int. Cl.
H04B 3/00 (2006.01)

(52) U.S. Cl.
USPC .......................................... 375/257

(58) Field of Classification Search
USPC .......................................... 375/257
See application file for complete search history.

(56) References Cited

U.S. PATENT DOCUMENTS

| 4,608,702 | A | 8/1986 | Hirzel et al. |
| 4,756,667 | A * | 7/1988 | Wyrostek et al. ............ 416/155 |
| 5,506,862 | A | 4/1996 | McIntosh |
| 5,835,542 | A | 11/1998 | Lu |
| 6,133,709 | A * | 10/2000 | Puchianu ....................... 320/116 |
| 6,359,973 | B1 * | 3/2002 | Rahamim et al. .......... 379/93.05 |
| 6,445,330 | B1 | 9/2002 | Thomsen et al. |
| 7,366,251 | B2 | 4/2008 | Luhman et al. |
| 7,444,124 | B1 * | 10/2008 | Loeb et al. ................. 455/127.3 |
| 2004/0008187 | A1 | 1/2004 | Gaksch et al. |
| 2006/0055379 | A1 * | 3/2006 | Yamamoto et al. ........... 323/212 |
| 2009/0243028 | A1 | 10/2009 | Dong et al. |
| 2010/0073038 | A1 | 3/2010 | Pagnanelli |
| 2010/0277231 | A1 * | 11/2010 | Hurrell et al. ................. 327/564 |
| 2010/0280786 | A1 * | 11/2010 | Gorbold et al. ............... 702/120 |
| 2012/0134394 | A1 | 5/2012 | Allen |

OTHER PUBLICATIONS

"Lithium Ion Battery Montioring System", "AD7280", 2008, pp. 1-33, Publisher: Analog Devices, Inc., Published in: Norwood, MA.
"Multicell Battery Stack Monitor", "LTC6802-1", 2008, pp. 1-32, Publisher: Linear Technology Corporation, Published in: Milipatis, Ca.

* cited by examiner

Primary Examiner — Juan A Torres
(74) Attorney, Agent, or Firm — Fogg & Powers LLC

(57) ABSTRACT

A communication system comprising a first and second transceiver is provided. The first transceiver has a first and second port coupled to a communication medium, wherein a first differential capacitor couples the first and second ports together. The second transceiver has a third and fourth port each AC coupled to the communication medium, wherein a second differential capacitor couples the third and fourth ports together.

20 Claims, 14 Drawing Sheets

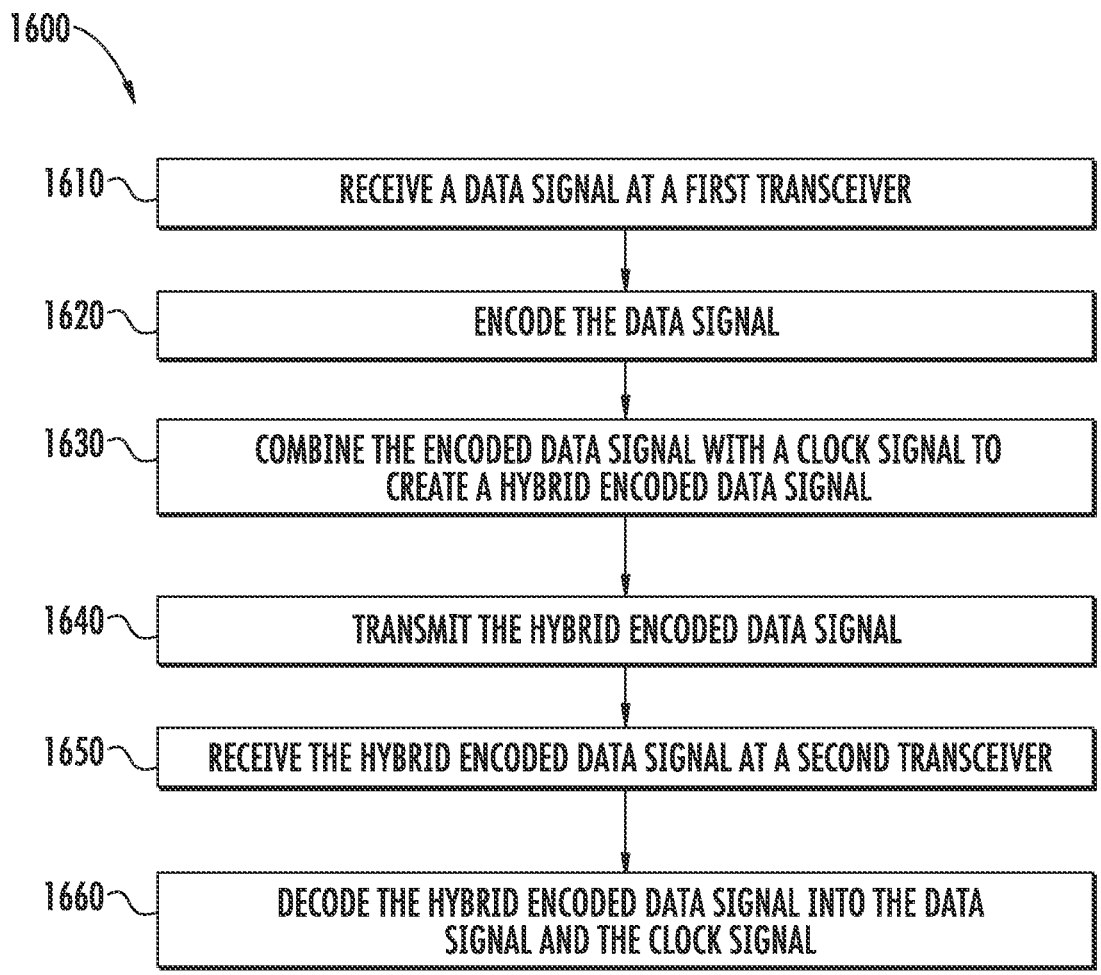

CAPACITIVE DIVIDER TRANSMISSION SCHEME FOR IMPROVED COMMUNICATIONS ISOLATION

CROSS-REFERENCE TO RELATED APPLICATIONS

This application is related to U.S. provisional patent application Ser. No. 61/176,800 entitled "A ROBUST 2-WIRE DAISY CHAIN COMMUNICATION SYSTEM," filed on May 8, 2009 and referred to herein as the '800 application. The present application hereby claims the benefit of U.S. Provisional Patent Application No. 61/176,800. The '800 application is hereby incorporated herein by reference.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 16 is a flowchart of one embodiment of a method of transmitting data over an isolated communication system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

High voltage systems often require communication schemes that offer both voltage isolation and robust performance in the presence of electromagnetic interference (EMI) and power transients. Such schemes are further improved through limiting EMI emissions. Embodiments described herein provide transmission systems and schemes that have high transient and EMI immunity with low EMI emissions.

Some embodiments of the communication system described herein are AC coupled to provide improved tolerance of system voltage transients and maintain robust communications in an EMI environment. Other embodiments described herein combine clock and data signals to from a single DC balanced signal that does not require frequency synchronization methods (such as being phase-locked looped (PLL)) to recover information therefrom. Some embodiments of the low cost transmission system operate over a single twisted pair without the need for screening or additional noise suppression.

Figure 1A:
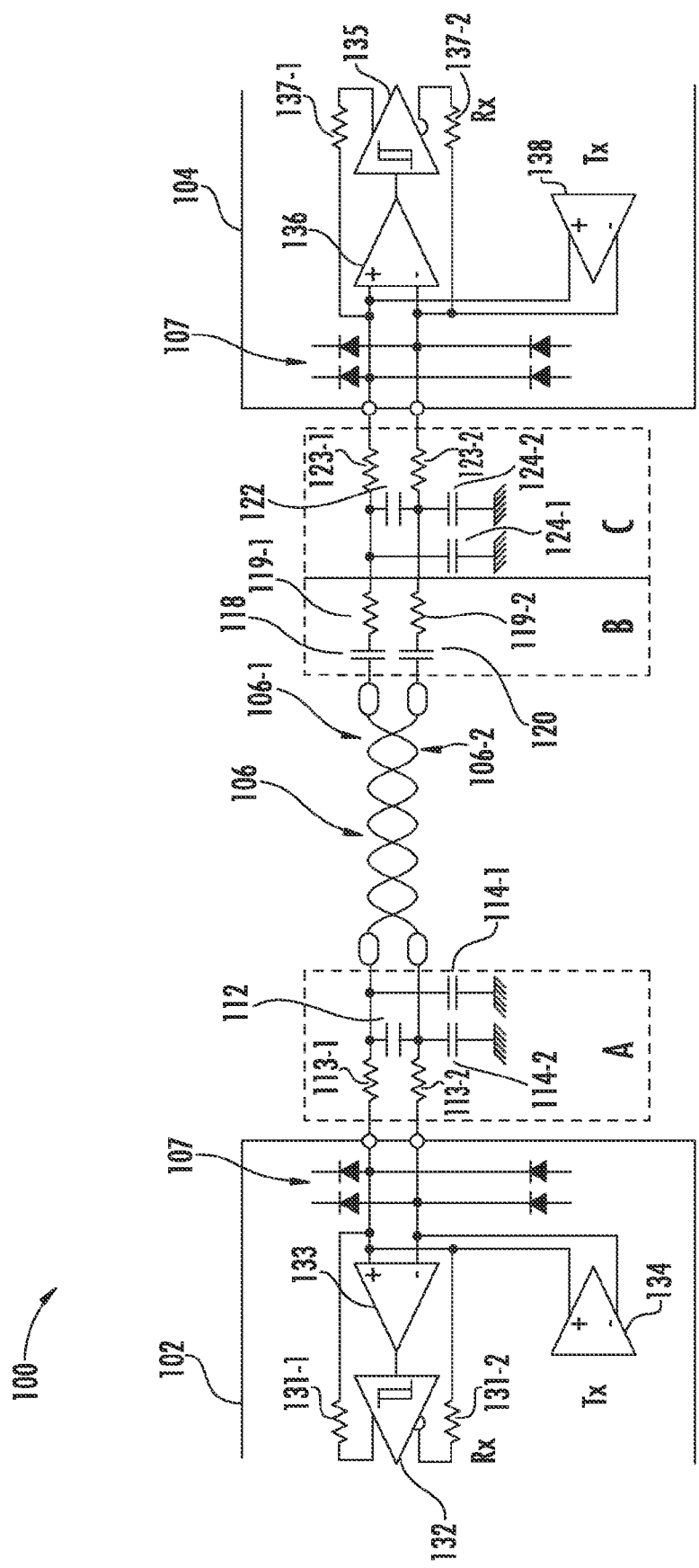
FIG. 1A is a schematic diagram of one embodiment of a communication system.

FIG. 1A is schematic diagram of one embodiment of a communication system 100. The communication system 100 comprises a first transceiver 102 coupled to a second transceiver 104 via a communications medium 106. The communication medium 106 functions as a transmission line between the first and second transceivers 102 and 104. Embodiments of the communications medium 106 include a wired link such as a cable (for example, a flexible flat cable), circuit board trace, twisted pair or other communication medium. Communication between first and second transceivers 102 and 104 is bi-directional over the shared communication medium 106. In the embodiment shown in FIG. 1A, the communications medium 106 and the first and second transceivers 102 and 104 are coupled together over two lines or paths generally referred to as lines 106-1 and 106-2. The connection of the communications medium 106 to the first and second transceivers 102 and 104 is achieved with any suitable connection now known or later developed.

The first transceiver 102 has a receiving functionality comprising a trigger driver 133 coupled to the input of a differential driver 132, wherein two feedback resistors 131-1 and 131-2 are coupled to outputs of the differential driver 132. The first transceiver 102 also comprises a transmit driver 134. Symmetrically, the second transceiver 104 has a receiving functionality comprising a trigger driver 136 coupled to the input of a differential driver 135, wherein two feedback resistors 137-1 and 137-2 are coupled to outputs of the differential driver 135, and a transmitting functionality comprising transmit driver 138. The resistors described herein are any suitable resistive element.

The connections of communication system 100 are discussed herein with respect to blocks A, B, and C. As will be described, blocks A and C provide termination load for block B, which reacts to provide voltage division. Blocks A and C provide a low impedance load condition which allows the transmission of the signal while diminishing EMI effects.

Shown generally at block A, the first transceiver 102 is connected to the communications medium 106 via communication pin input clamps 107, resistors 113-1 and 113-2, and capacitors 114-1 and 114-2 for lines 106-1 and 106-2, respectively. The capacitors 114-1 and 114-2 are each connected to ground and provide a capacitive voltage divider with the AC coupling capacitors 118 and 120, respectively. A differential capacitor 112 is placed across lines 106-1 and 106-2 between the resistors 113-1 and 113-2 and the communications medium 106. In one embodiment, transceiver 102 and block A are co-located on a single chip. In another embodiment, one or both of the transceivers 102 and 104 are quadrature amplitude modulation (QAM) transceivers.

The differential capacitor 112 connects lines 106-1 and 106-2 and acts as a capacitive voltage divider through rejecting high frequency interference. Capacitor 112 provides a differential capacitive termination load and reduces the tolerance effects of capacitors 114-1 and 114-2. When the communication system 100 is exposed to EMI with a frequency higher than the data communication rate, the low impedance on the lines 106-1 and 106-2 from the presence of the differential capacitor 112 diminishes the effect of the EMI at the receiver side. Furthermore, the low impedance and high frequency at the receiver work together to reject the EMI. The differential capacitor 112 reduces the tolerance effects of the ground connected capacitors 114-1 and 114-2.

Shown generally at block C (symmetric with block A), the second transceiver 104 is connected to the communications medium 106 via resistors 123-1 and 123-2 and capacitors 124-1 and 124-2 for lines 106-1 and 106-2, respectively. The capacitors 124-1 and 124-2 are each connected to ground. A differential capacitor 122 connects lines 106-1 and 106-2 and is positioned between the resistors 123-1 and 123-2 and the resistors 119-1 and 119-2. The differential capacitor 122 provides a capacitive voltage divider with the capacitors 118 and 120. The capacitors in block C operate in the same manner as the capacitors in block A.

Shown generally at block B, the second transceiver 104 is AC coupled to the communications medium 106. The AC coupling capacitors 118 and 120 and resistors 119-1 and 119-2 create an AC coupling network that improves isolation of the communication system 100 from high voltage transient events. Line 106-1 is AC coupled to the second transceiver 104 with coupling capacitor 118 in series with resistor 119-1. Similarly, line 106-2 is AC coupled to the second transceiver 104 with coupling capacitor 120 in series with resistor 119-2. The resistors 119-1 and 119-2 provide current limiting capability.

Capacitors 114-1 and 114-2 are differential termination capacitors that provide protection against transients by forming discharge paths to ground. Capacitors 114-2 and 120 form a voltage divider. Likewise, capacitors 114-1 and 118 form a voltage divider. This voltage dividing protects the communications system 100 from some transient events and is matched to ensure communication integrity. The resistors in blocks A and C further enhance the level of protection against transient events by limiting the current of signals through the communication medium 106. In one embodiment, transceiver 104 and blocks B and C are located together on a single chip.

The functionality of the communication system 100 is described herein in terms of unidirectional communication for illustrative purposes. The first transceiver 102 (acting as the transmitter) transmits a signal to the second transceiver 104 (acting as the receiver). While the first transceiver 102 is transmitting, the capacitors and resistors in block A control the edge rate of the signal (that is, the rise time of the signal). In one embodiment, the transmitted signal is modified by switched current sources, described below in FIG. 4, in the transceiver 102 such that the capacitors 112, 114-1, and 114-2 receive a ramp signal. The frequency of the EMI emissions from this signal is determined by the rise time of the ramp, wherein raising the frequency of the transmitting signal increases the power of the EMI. Consequently, the power in the communication system 100 is determined by the frequency of the edges. As the rise time of the signal transmitted by the transceiver 102 is reduced, the frequency of the signal transmitted over communication medium 106 is increased. Potential EMI is reduced due to the split differential architecture of the communication system 100 and the coupling of the transceiver 102 to the communication medium 106. When the second transceiver 104 transmits, block C acts like block A described above with respect to first transceiver 102 transmitting.

The resistors 113-1 and 113-2 improve the rejection of very high frequency (VHF) EMI along with the pin input capacitance of the transceivers 102 and 104. Some embodiments of the communication system 100 comprising a current source derived transmission scheme do not include resistors 113-1 and 113-2.

Two examples of values of the components in blocks A, B, and C are described herein to illustrate signal levels commensurate with a particular current source value relationship. Example 1 and Example 2 maintain similar ratios of the values of components so that both examples are interchangeable with the communications system 100. In Example 1, the communication pin input clamps 107 survives, for example, a 110 mA current surge in response to a 120 V voltage spike between the transceivers 102 and 104. The surge current rating on the communication pin input clamps 107 in Example 2 is 152 mA, for example, and is used for installations with higher parasitic capacitance values than Example 1. It is noted that these examples are merely illustrative, and the capacitance and resistance can be of any suitable value.

TABLE I

| Component | Example 1 values | Example 2 values |
| --- | --- | --- |
| Capacitors 114-1, 114-2, 124-1, and 124-2 | 47 pF | 100 pF |
| Differential Capacitors 112 and 122 | 100 pF | 220 pF |
| Resistors 113-1, 113-2, 123-1, and 123-2 | 100 Ω | 100 Ω |
| AC Coupling Capacitors 118 and 120 | 100 pF | 220 pF |
| Resistors 119-1 and 119-2 | 1 kΩ | 680 Ω |

Figure 1B:
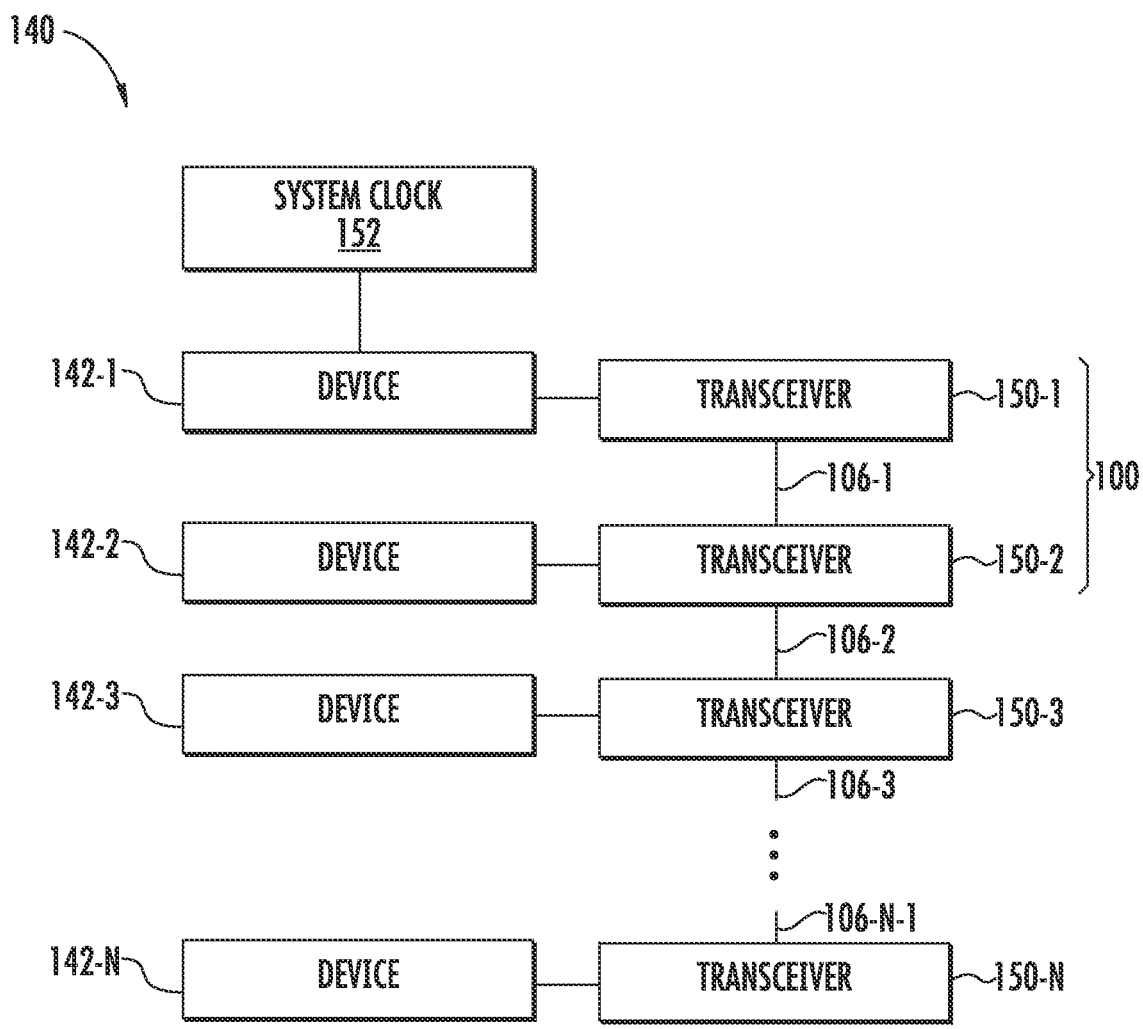
FIG. 1B is a block diagram of one embodiment of a system utilizing the communication system of FIG. 1A.

FIG. 1B is a block diagram of one embodiment of a daisy chain system 140 utilizing the communication system 100 of FIG. 1A. System 140 comprises N devices 142-1 through 142-N communicatively coupled together in a daisy chain manner using the communication system 100. Device 142-1 is communicatively coupled to a first transceiver 150-1 which is coupled to communications medium 106-1 coupled to a second transceiver 150-2 coupled in turn to device 142-2. The first transceiver 150-1, communications medium 106-1, and second transceiver 150-2 make up a communications system 100 and are coupled together as shown in FIG. 1A. To connect a third device 142-3 in the daisy chain system 140, the second transceiver 150-2 is also coupled to a third transceiver 150-3 coupled to communications medium 106-2. In a similar manner, transceiver 150-N links $N^{th}$ device 142-N to the daisy chain system 140. Each transceiver 150-1 to 150-N has at least two transmit ports and two receive ports.

In one embodiment, the daisy chain system 140 functions as follows, for example. The timing of the daisy chain system 140 is controlled by a system clock 152. The device 142-1 provides a CLK signal from the system clock 152 and a data signal to the transceiver 150-1, referred to herein as the daisy chain signal. The daisy chain signal is a differential signal from one or more communication systems 100 linked together in a daisy chain manner as shown in FIG. 1B. Embodiments of the daisy chain signal include communications signals such as, for example, register contents, device commands and reading or writing register contents. In one embodiment, the transceivers 150-2 through 150-N provide the extracted CLK signal from the system clock 152 to the devices 142-2 through 142-N, respectively.

The transceiver 150-1 encodes the data with the CLK signal (for example, via a Manchester encoding scheme, discussed below) and combines the encoded data with an amplified CLK signal for a hybrid encoded data signal that is amplitude modulated. This hybrid encoded data signal is then transmitted over communication medium 106-1 to transceiver 150-2. Operating in receive mode, transceiver 150-2 receives the hybrid encoded data signal, decodes the data and extracts the CLK signal. The transceiver 150-2 provides the decoded data and CLK signal to the device 142-2. This process is similarly repeated throughout the daisy chain system 140.

In one embodiment, the communication system 100 is packaged onto a single chip which can be mounted on a board. The board is then connected to a device 142-1. The board can then be connected to a device, such as device 142-1. In one embodiment, a plurality of boards connect to a plurality of battery cells in a daisy chain fashion. This daisy chain system becomes a module that goes into a battery pack. In one embodiment, the battery cells are Lithium ion (Li-ion) battery cells. In another embodiment, 12 Li-ion battery cells are connected by communication systems 100 to make a robust module protected from many transient events and EMI.

Figure 2A:
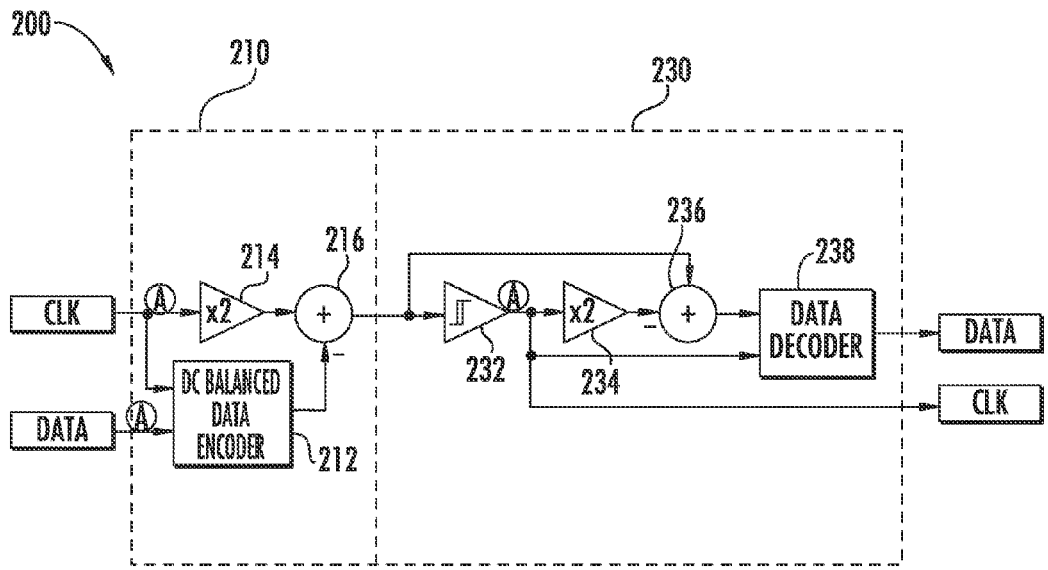
FIGS. 2A and 2B are block diagrams of alternative embodiments of a transceiver.

FIG. 2A is a block diagram of one embodiment of a transceiver 200 comprising a transmitter 210 and receiver 230. The transmitter 210 comprises a DC balanced data encoder 212, a multiplier 214, and a summer 216. The transmitter 210 receives a data signal from a device and a clock signal, encodes the data, combines the encoded data with an amplified clock signal, and transmits the data, for example, over communications medium 106. The receiver 230 receives a hybrid encoded data signal, for example, over communications medium 106, decodes the data signal and extracts a clock signal.

One embodiment of the DC balanced data encoder 212 employs Manchester encoding; however, the DC balanced data encoder 212 may utilize any other encoding scheme that DC balances data. Manchester encoding is a basic encoding scheme that provides two clock cycles for every bit of data, for a 50% efficiency level. In other words, every two edges of a Manchester encoded data stream results in one bit of data.

The data (DATA) and clock (CLK) signals, which have similar amplitudes in one embodiment, are encoded in DC balanced data encoder 212. The CLK and DATA signals are combined into a timing encoded signal that is based on an amplitude modulated Manchester encoding scheme. Thus, the clock signal can be easily recovered from the Manchester encoded data without requiring a phase locked loop (PLL) as the CLK signal is embedded in the timing encoded signal. Furthermore, because a PLL is not necessary, a training sequence used to trigger the PLL does not have to be added to the output of the DC balanced data encoder 212. Therefore, every bit of the DATA signal is recoverable without delay because the timing encoded signal does not have to be locked to a clock.

The amplitude of the clock signal is multiplied by a factor, for example, 2, using multiplier 214. Summer 216 sums the timing encoded signal and the multiplied CLK signal (the outputs of DC balanced data encoder 212 and multiplier 214, respectively) and generates a summed output that is transmitted to receiver 230.

Receiver 230 comprises a zero crossing detector 232 and a summer 236, both coupled directly to the transmitter 210, a multiplier 234, and a data decoder 238. Zero crossing detector 232 receives the transmitted encoded signal and recovers the CLK signal at its output terminal. The output of zero crossing detector 232 is multiplied by multiplier 234 and supplied to a first input terminal of summer 236. Summer 236 receives the transmitted signal at its second input terminal. Data decoder 238 receives the output of summer 236 and the clock signal recovered by zero-crossing detector 232 to recover the data. The signals shown at points A have similar amplitudes.

Figure 2B:
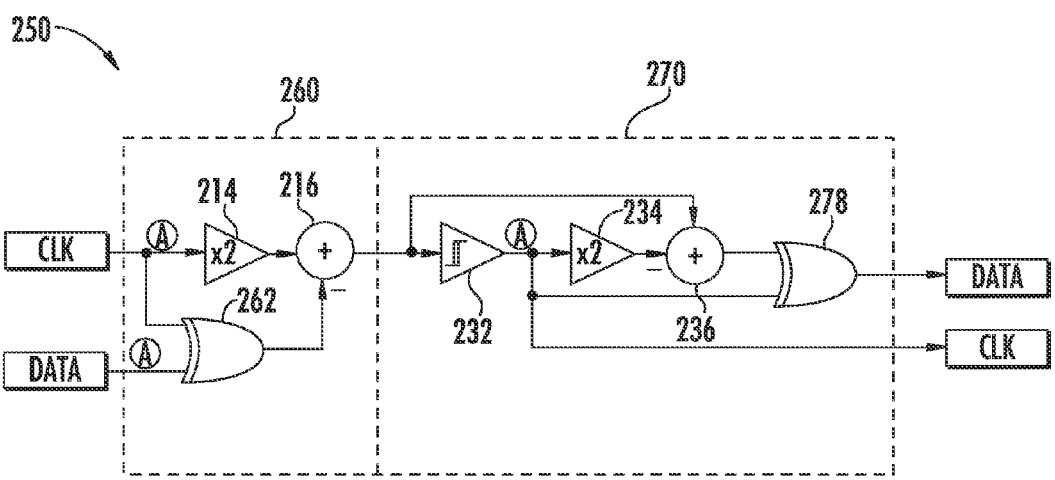
Figure 4:
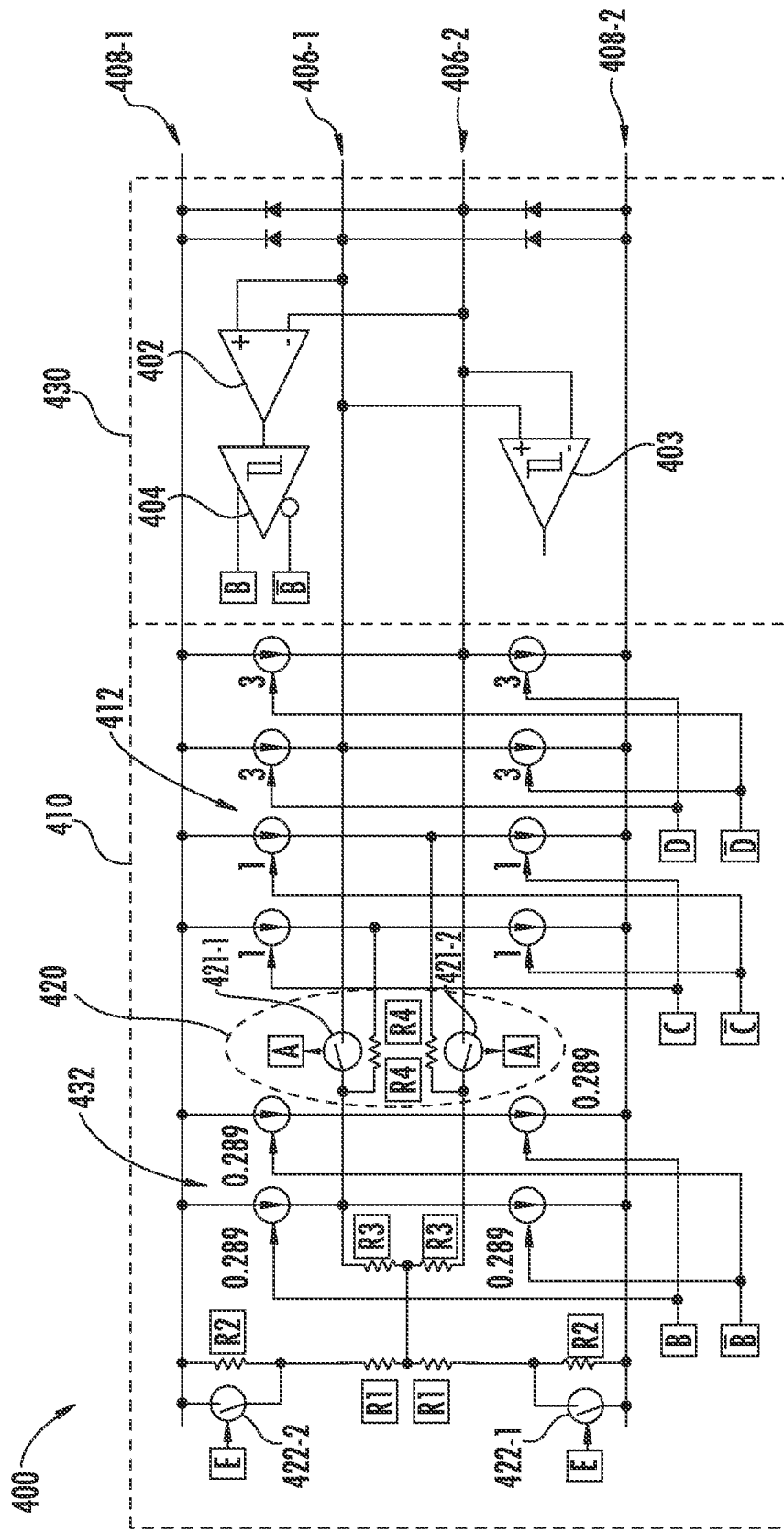
FIG. 4 is a schematic diagram of one embodiment of a transceiver.
Figure 5:
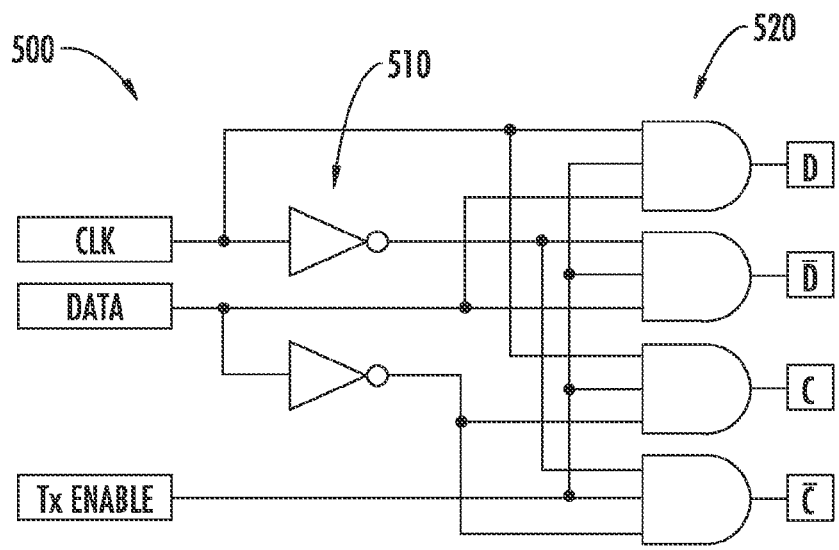
FIG. 5 is a schematic diagram of one embodiment of an encoder.

FIG. 2B is a block diagram of one embodiment of a transceiver 250 comprising a transmitter 260 and receiver 270. Transmitter 260 is similar to transmitter 210 except that transmitter 260 uses an XOR gate 262 in place of DC-balanced and data encoder 212. Likewise, receiver 270 is similar to receiver 230 except that receiver 270 uses an XOR gate 278 in place of data decoder 238. The encoded signal is generated by mixing the Manchester encoded signal (generated by XOR gate 262) with the clock signal to provide a hybrid encoded signal. The hybrid encoded signal is an amplitude modulated signal with a zero crossing at each clock edge. The hybrid encoded signal maintains full integrity of the data signal. The signals are produced using simple logic and a voltage summing node or using switched current sources as shown in FIGS. 4 and 5 below. A 2:1 relationship is used in FIGS. 2A and 2B for illustrative purposes, but any ratio can be implemented.

Figure 3A:
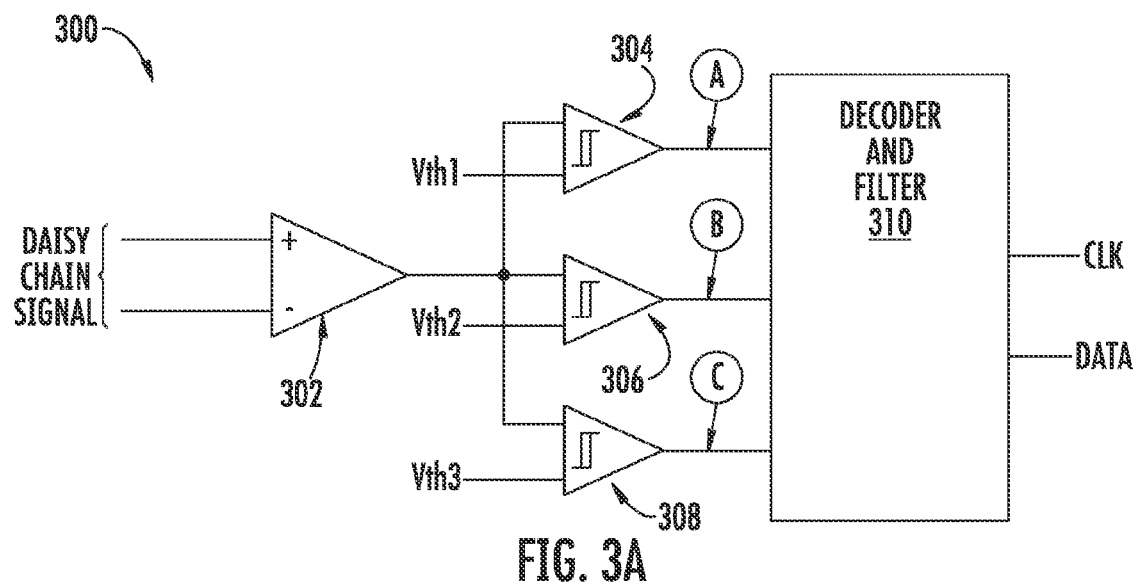
FIG. 3A is a block diagram of one embodiment of a receiver.

FIG. 3A is a block diagram of one embodiment of a receiver 300. The receiver 300 comprises a differential receiver 302 that receives a differential daisy chain signal at its inputs. The differential receiver 302 converts the differential daisy chain signal into a single ended signal that is fed into a first input of comparators 304, 306, and 308. Thresholds Vth1, Vth2, and Vth3 are inputted to the second input of comparators 304, 306, and 308, respectively, and define the signal levels for the various daisy chain states. The zero-crossing defines the CLK signal, where the positive and negative voltage swings are associated with the '0' and '1' states of the daisy chain signal. The outputs of comparators 304, 306, and 308 are inputted to a decoder and filter 310 that decodes the inputted signals into the CLK and DATA signals.

Figure 3B:
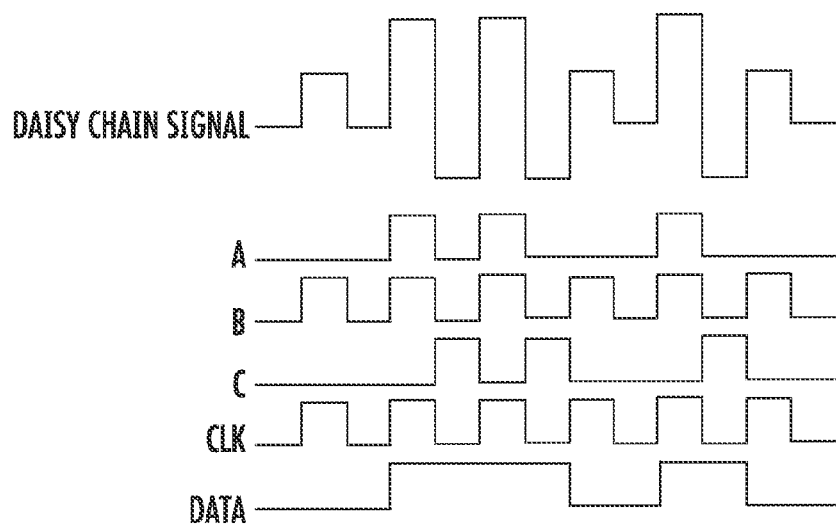
FIG. 3B is an exemplary timing diagram corresponding to the receiver of FIG. 3A.

FIG. 3B is a timing diagram corresponding to the receiver 300 of FIG. 3A. The daisy chain signal is the differential input signal to differential receiver 302. The signals A, B, and C correspond to the outputs of comparators 304, 306, and 308, respectively. In this example, comparator 306 compares the differential daisy chain signal and threshold Vth2. Threshold Vth2 has a voltage of zero or a nominal voltage. Therefore, comparator 306 detects zero crossings and directly recovers the clock signal B. The thresholds Vth1 and Vth3 are set to detect high level transitions of the daisy chain signal. Threshold Vth1 is set to detect high amplitude pulses and ignore low amplitude pulses. Comparator 304 outputs signal A to which has a pulse for every high amplitude pulse using threshold Vth1. Similarly, threshold Vth3 is set to detect low amplitude pulses only, wherein comparator 308 outputs signal C with a pulse for every low amplitude pulse on the daisy chain signal. The decoder and filter 310 resolves the signals A, B, and C into the CLK and DATA signals. In one embodiment, the decoder and filter 310 comprises a clock filter, a data filter, and a data retiming function, as described in more detail below in FIG. 7.

Figure 3C:
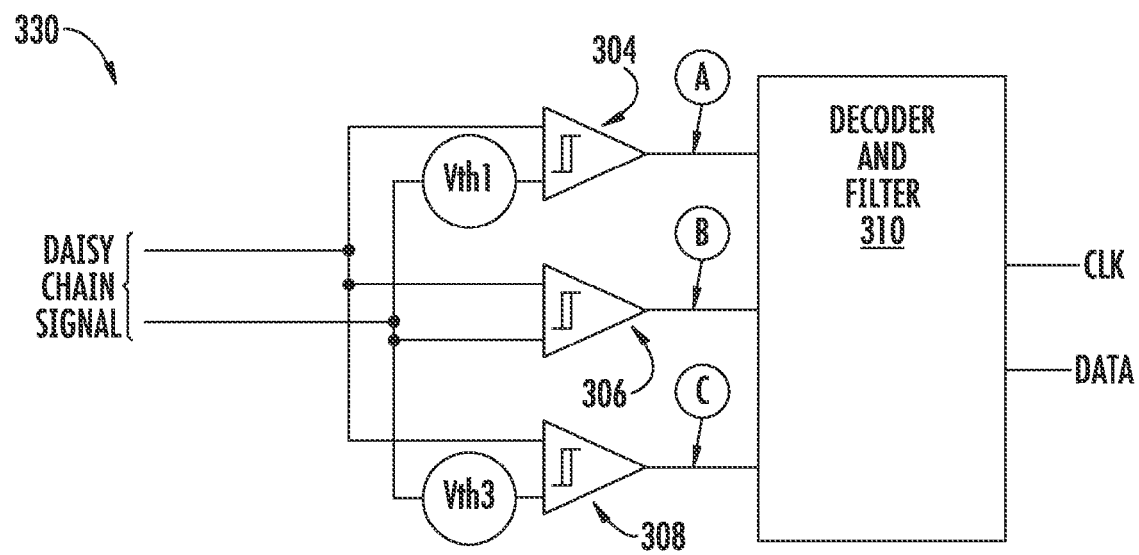
FIG. 3C is a block diagram of an alternate embodiment of a receiver.

FIG. 3C is a block diagram of an alternate embodiment of a receiver 330. Like receiver 300, receiver 330 comprises comparators 304, 306, and 308 and decoder and filter 310. However, receiver 330 does not have a differential receiver 302 like in receiver 300. Instead, a first daisy chain signal is directly provided to a first input of the comparators 304, 306, and 308. The second daisy chain signal (the inverse of the first daisy chain signal) provided to a second input of the comparator 304 modified by threshold Vth1, directly to a second input of comparator 306, and to a second input of comparator 308 modified by threshold Vth3.

FIG. 4 is a schematic diagram of one embodiment of a transceiver 400. The transceiver 400 comprises a transmitter shown generally at 410 and a receiver shown generally at 430. The transceiver 400 receives control signals at inputs A, B, C, D, E, and their corresponding inverted signals, B-bar, C-bar, and D-bar. Lines 406-1 and 406-2 are differential lines go out to pins (for example, on an external device in some embodiments) that connect to a communications medium (for example, communications medium 106). Lines 408-1 and 408-2 supply power to the transceiver 400. The transceiver 400 operates in four modes, normal mode, receive mode, transmit mode, and sleep mode, described below.

Transceiver 400 further comprises a receive amplifier 402, a zero-crossing detector 404, and a sleep mode receiver 403. The transceiver further comprises a switch circuit shown generally at 420. FIG. 4 also illustrates a multitude of switched current sources that combine the clock and Manchester encoded data into a hybrid encoded signal. The transmitter 410 comprises a plurality of transmit current sources 412 shown as 1x unit and 3x unit sources, while the receiver 430 controls a plurality of receive current sources 432 shown as 0.289x units. These ratios produce specific waveforms during transmission and receipt, and accommodate specific external circuit values. However, it is understood that other values are used in other implementations.

During normal mode, there is no activity on the daisy chain and both receiver ports of every transceiver 400 in the daisy chain system are primed to receive a signal. In normal mode, the transceiver 400 waits to detect a daisy chain signal arriving at lines 406-1 and 406-2 connected to the two receiver ports. In normal mode, the receive amplifier 402 and the zero-crossing detector 404 that drives the current sources 432 are active. The receive amplifier 402 is active while the receiver 430 is in normal mode and translates the input waveform voltage levels and timing for subsequent decoding. The zero crossing detector 404 generates the receive servo signals B and B-bar. Receive servo signal B and B-bar control current sources 432 and are active during normal mode and receive mode.

During receive mode, the transceiver 400 detects an incoming transmission at a receive port from the daisy chain. The transceiver 400 relays the information coming in on a receive port to a transmit port to be transmitted to the next transceiver along the daisy chain. Every component that was active during normal mode is also active during receive mode. The bypass switches 421-1 and 421-2 have low open capacitances so as not to load the input waveform with receive servo signals produced by B and B-bar and current sources 432. The receive servo current sources 432 are adjusted for any change in R3. Signals B and B-bar maintain a bus idle condition and promote correct DC values when the transceiver 400 is in receive mode. In normal or receive mode, current sources C, C-bar, D, and D-bar are off because they are transmit functions. Switches A are open in receive mode so the path from the input to the receive servo current sources 432, goes through resistors R4.

The signals C and C-bar are 1x unit current source switch drive signals that control the 1x unit transmit current sources 412, which are disabled during receive mode. The signals D and D-bar are 3x unit current source switch drive signals control the 3x unit transmit current sources 412, which are also disabled during receive mode. As described below, FIG. 5 is an exemplary encoder that drives the signals C, C-bar, D, and D-bar.

In transmit mode, the transceiver 400 transmits an encoded signal along the daisy chain. Signals B and B-bar are disabled when the transceiver 400 is in transmit mode and control signals C, C-bar, D, and D-bar are turned on. The switches A close so resistors R4 are bypassed, resulting in a low impedance path back to resistors R3. The output level is set by the value of R3 and the value of the current through R3, which is caused by the current sources 412 with C, C-bar, D, and D-bar. The receiver 430 is disabled during transmit mode.

Sleep mode puts the transceiver 400 into a low current state where receive amplifier 402 and zero crossing detector 404 are powered down while the sleep mode receiver 403 is powered up. The control signals B, B-bar, C, C-bar, D, and D-bar are off in sleep mode. During sleep mode switches E are open. In one embodiment, resistors R2 have a high value resistance compared with the resistance of resistors R1. In contrast with normal mode, where switches E are closed and resistors R2 are bypassed, in sleep mode current flows through resistors R2 and R1. In one embodiment, there is a buffer between a connection of the centers of resistors R1 and R3.

The sleep mode receiver 403 wakes the transceiver 400 from sleep mode when it detects a zero crossing over the communication lines 406-1 or 406-2. In one embodiment, sleep mode receiver 403 processes a 4 kHz input clock signal and operates at a relatively very low power. Once a wakeup condition is identified, a sleep mode receiver optionally shuts down and the transmit mode receiver 402 is activated. The transmitter 410 is also activated and is used to relay the wakeup signal to the next linked device in embodiments where the transceiver 400 is part of a daisy chain.

The transmit mode receiver 402 also feeds zero crossing detector 404 which provides communications idle condition servo signals during receive mode. The communications idle condition results from the clock and data signals both being at a predetermined logic level. In one embodiment, all transmissions begin with the bus in the idle condition, and the bus always reverts to the idle condition following a transmission. The receiver 430 is forced to the bus idle condition (if not already in this condition) following a communications timeout as part of an error recovery system. In some embodiments, depending on the location of filtering used for high frequency (HF) noise rejection, the zero crossing detector 404 used for the servo function is the same detector used for clock recovery. In other embodiments, the zero crossing detector 404 does not perform clock recovery.

The transceiver 400 further comprises a switching circuit shown generally at 420 that provides a switch over signal that toggles the transceiver 400 between transmit and receive modes. The switching circuit 420 comprises bypass resistors R4 and bypass switches 421-1 and 421-2 that receive signals provided at A. The signal A drives the switching circuit 420, which bypasses the resistors R4 while the transceiver 400 is in transmit mode. Resistors R4 isolate drive impedance from external circuit impedance while the transceiver 400 is receiving. An exemplary value of resistors R4 is 10 kΩ, assuming ideal switches; however any suitable resistance value may be used. The on-resistance of bypass switches 421-1 and 421-2 is taken into account when sizing source resistors R3. Resistors R3 interact with the current sources for both transmitter 410 and receiver 430 and provides transmitter source impedance and drive level settings for the transmit signal level.

Exemplary values of R3 include 200Ω, with 150Ω and 100Ω metal options, or any other suitable resistance value.

Signal E drives switches 422-1 and 422-2 that bypass sleep mode bias resistors R2 to allow higher bias current in transmit mode. Resistors R2 provide bias generation during sleep mode. Resistors R1 generate a bias voltage during transmit mode. In another embodiment, additional switches are used to isolate the bias networks in shutdown mode.

The unit current source values are programmable, for example, with non-volatile memory or masks. In one example, currents of 2.5 mA and 4 mA are used with the exemplary resistance R1-R4 values discussed above and using the external circuit of, for example, FIG. 9 described below, with the external circuit component values shown in Table I above. Exemplary selected current source values are 2.5 mA, 4 mA, and 6.5 mA, but can be any suitable current. In this embodiment, the theoretical average current drawn while the transceiver 400 is transmitting is then nearly twice the unit current value.

In an alternate embodiment of FIG. 4, the current sources are reconfigured such that the transmitter current sources 412 are located on the left of switching circuit 420 and receiver current sources 432 are on the right of switch circuit 420. This provides improvements in current consumption and signal level accuracy.

FIG. 5 is a schematic diagram of one embodiment of an encoder 500. In this embodiment, the encoder 500 is a transmitter encoding circuit that receives a CLK, DATA, and transmit enable (Tx enable) signals and outputs C, C-bar, D, and D-bar. The transmitter encoding circuit 500 comprises two inverters 510 and four AND gates 520. The D, D-bar, C, and C-bar drive signals are used to correctly encode the data stream to into the encoded hybrid signal.

In one embodiment, transmit encoding circuit 500 is coupled to the transmitter 410 of FIG. 4 at C, C-bar, D, and D-bar. In one embodiment, the transmitter encoding circuit 500 provides an additional edge boost function that reduces the rise time of the unit transitions, which aids in maintaining clock recovery timing. The system turns on the relevant 3x current source momentarily at the start of each 1x transition, amplifying the waveform and producing similar zero crossing timing for both 1x to 3x and 3x to 1x transitions.

Figure 6:
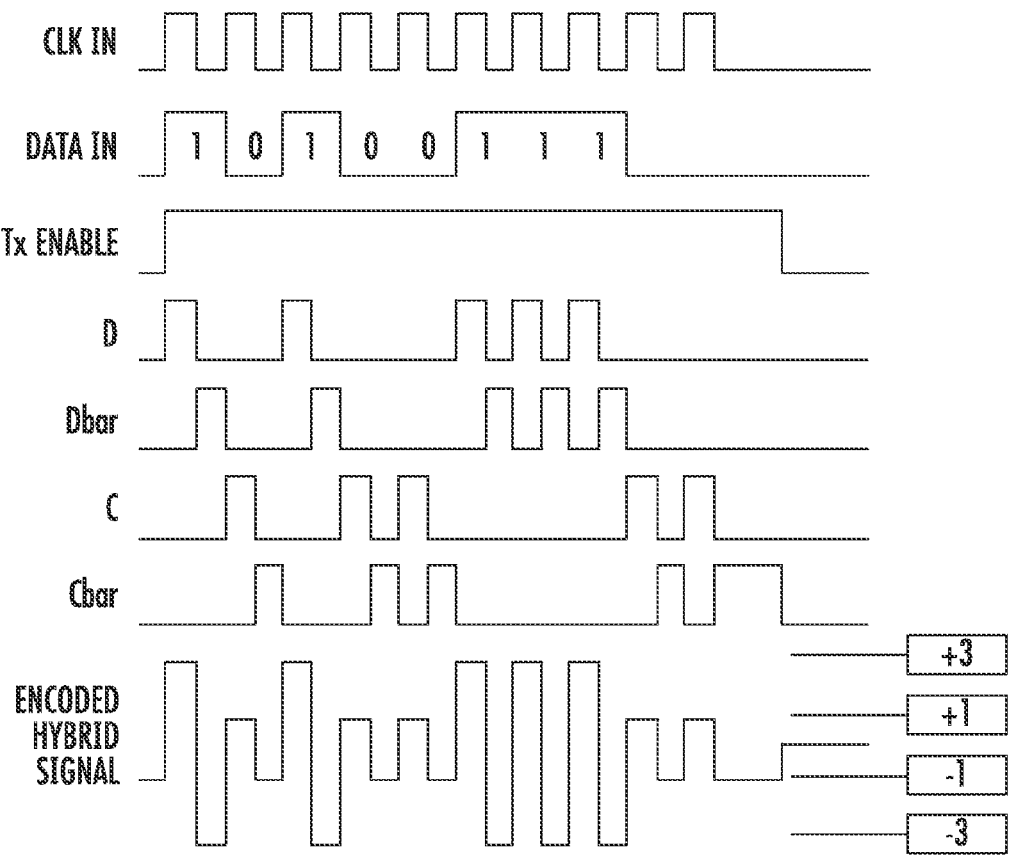
FIG. 6 is an exemplary timing diagram of signals in the circuits of FIGS. 4 and 5.

FIG. 6 is a timing diagram of one embodiment of signals in the circuits of FIGS. 4 and 5. In one embodiment, FIG. 6 achieves the same end result as is achieved in FIG. 2A, but shows the intermediate driver signals D, D-bar, C, and C-bar the transceiver 400 uses to produce the encoded hybrid signal output. The encoded hybrid signal is the final output of the transceiver 400 of FIG. 4 without showing intermediary steps, for example, the Manchester encoded data.

The CLK, DATA, and Tx enable signals are inputted to the transmit encoding circuit 500, which outputs D, D-bar, C, and C-bar to the transceiver 400. The transmit enable signal (Tx enable) enables the transmitter 410 and has a logic high when the transceiver 400 transmits. The transmitter 410 may transmit when the device to which the transceiver 400 is coupled to (for example, device 142-1) wants to send a message or when the receiver 430 receives a message on one daisy chain port for relay through the next daisy chain port.

As shown in FIG. 6, the encoded signal is amplitude modulated (with an amplitude of −3, −1, 1, and 3 referred to a suitable unit value) and has a zero crossing at each clock edge. Because there is a zero crossing at each clock edge, CLK is directly recoverable.

Figure 7:
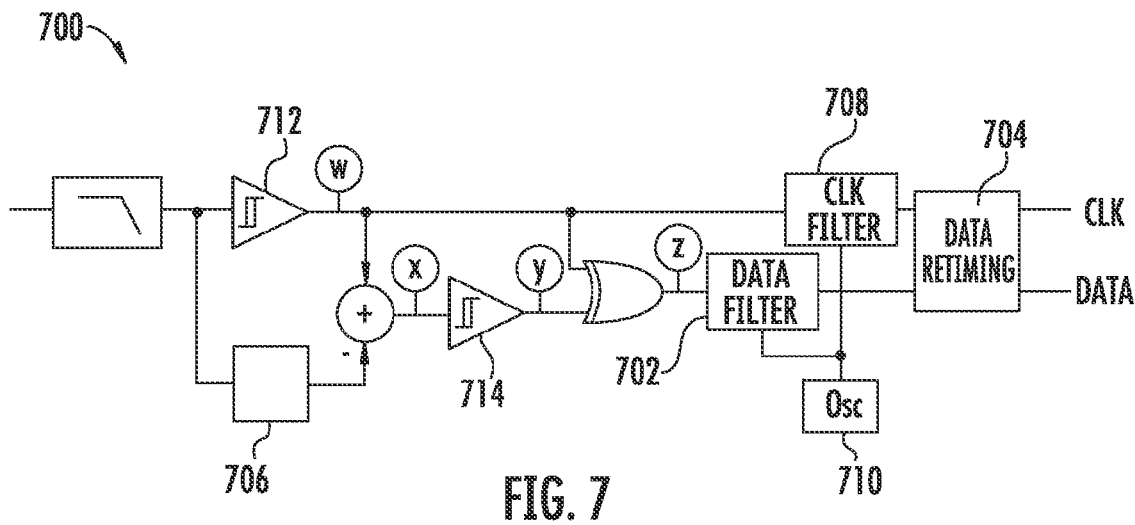
FIG. 7 is a schematic diagram of one embodiment of a receiver.

FIG. 7 is a schematic diagram of one embodiment of a receiver 700. Receiver 700 performs clock recovery, signal reconstruction, filtering and data retiming on the receiver end (for example, the receiving portion of second transceiver 104 in the communication system 100). The decoder 700 comprises a data filter 702, a data retiming block 704, a gain circuit 706, a clock filter 708, an oscillator 710, and a zero crossing detector 712.

In one embodiment, the receiver 700 performs the reverse functions to decode the data that a transmitter did to encode the data. The encoded data is provided at an input of the zero crossing detector 712, which recovers the CLK signal (w). The encoded signal is modified by gain 706, which is then subtracted from the recovered CLK signal w to create noisy recovered data signal (x), an amplitude constrained signal. The signal x is a first stage decoded data signal and is provided to an input of a zero-crossing detector 714. Filtering is applied to this function to help reduce high frequency noise effects. The zero-crossing detector 714 outputs a lower noise version of signal x (y). The data filter 702 further reduces the noise of signal y using a counter-based filtering operation to recover the data signal (z).

Data retiming block 704 retimes the data signal z to be one clock cycle later. The delay of 1 clock cycle is provided to the data signal z between daisy chain receipt and relayed signal output to accommodate the filtering of data filter 702. The output of the receiver 700 enables the signal to be transmitted at the start of the second daisy chain clock cycle such that the first transmitted clock cycle contains the first data bit. For example, the transceiver 104 comprises the receiver 700 which decodes the received data and prepares it for transmission by the transmitter in transceiver 104. In one embodiment, the receiver 700 is part of a daisy chain network. Other methods of data signal recovery are possible, including the use of direct signal threshold detection of the single ended signal.

Figure 8:
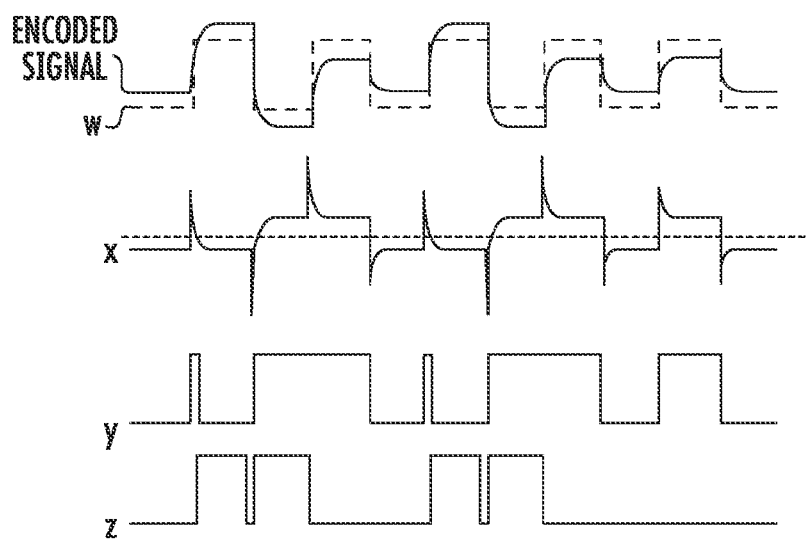
FIGS. 8 and 9 are exemplary timing diagrams corresponding to the receiver of FIG. 7.

FIG. 8 is an exemplary timing diagram corresponding to the receiver of FIG. 7. FIG. 8 shows the amplitude relationship between the incoming encoded signal (shown as a solid line) and recovered clock w (shown as a dashed line) together with the data signal x, y, and z as described above. The short pulses shown in data signal z are removed by data filter 702.

Figure 9:
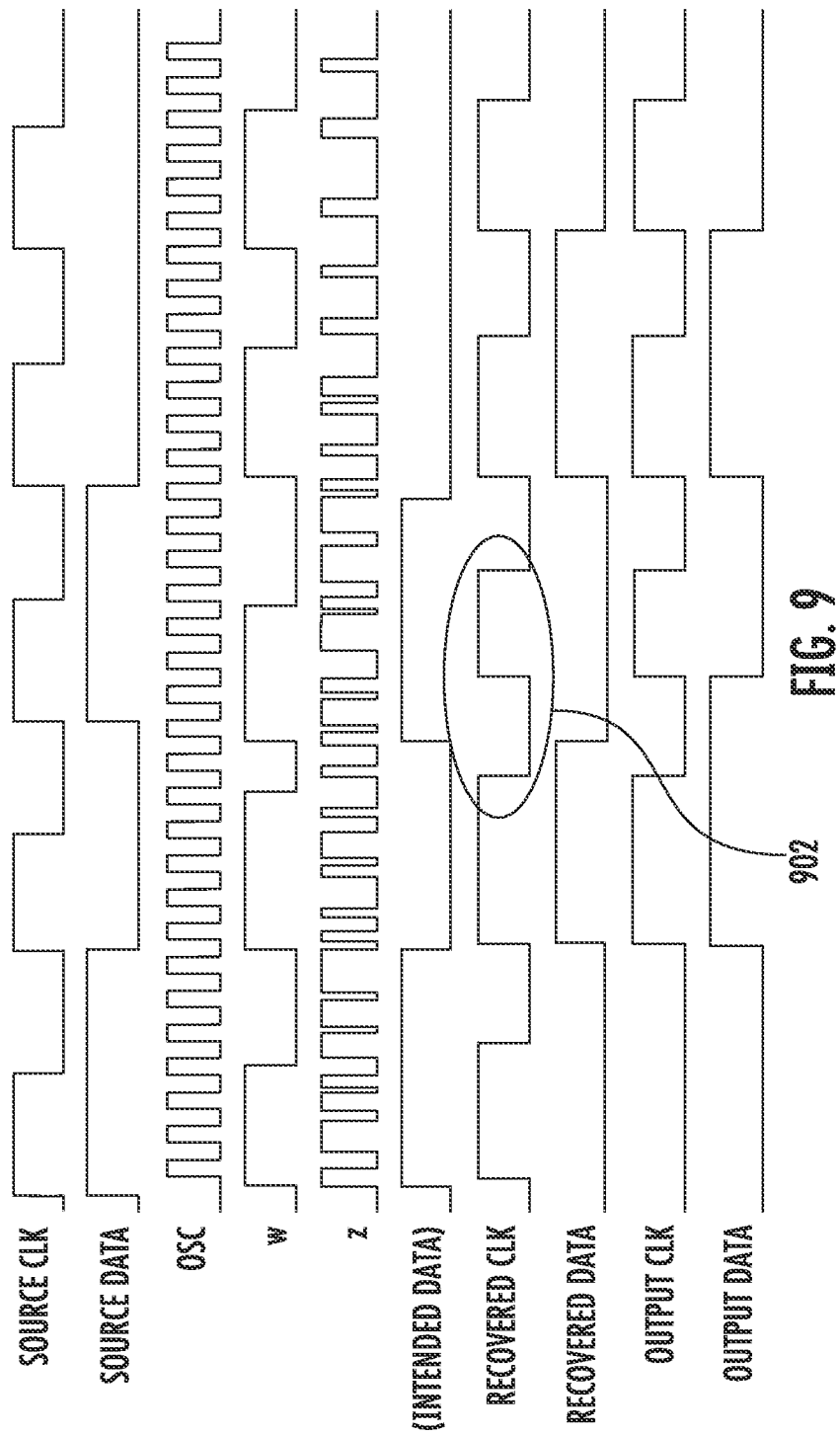

FIG. 9 is another exemplary timing diagram corresponding to the receiver of FIG. 7. In this example, the input and output signal relationships are shown for the receiver 700 as part of a daisy chain communication system, such as in FIG. 1B. An additional function of receiver 700 is to guarantee a minimum pulse width such that pulse widths shorter than a specified length are reproduced at the minimum allowed width. This is applied to both positive and negative pulses and is needed to limit the cumulative effects of clock jitter caused by extraneous noise sources such as EMI. The minimum pulse width is dependent on the daisy chain clock frequency and is generated by a number of cycles of the oscillator 710. For example, having a 500 kHz daisy chain clock and a 4 MHz system oscillator 710 (the rate of the daisy chain clock=oscillator rate/8) results in a minimum pulse width of 3 oscillator cycles guarantee correct operation with oscillator tolerances up to 15%. The oscillator 710 runs continuously while the transceiver is in normal communications mode. The second decoding function recovers the data signal (see, for example data decoders 238 and 278 of FIGS. 2A and 2B). In FIG. 9, pulse 902 has been modified to minimum width from the corresponding pulse in signal w, which was a short pulse.

In one embodiment the incoming differential signal is converted to single ended signal and mixed with the recovered clock to recreate the data signal. The incoming signal is scaled correctly for this process. A value for the gain 706 of, for example, 0.866 in FIG. 7, described above, provides the correct level for the circuit of FIG. 2B with 2.5 mA unit current and is referred to a 1 V peak-to-peak recovered clock signal with the external circuit elements given in Table I above.

Figure 10:
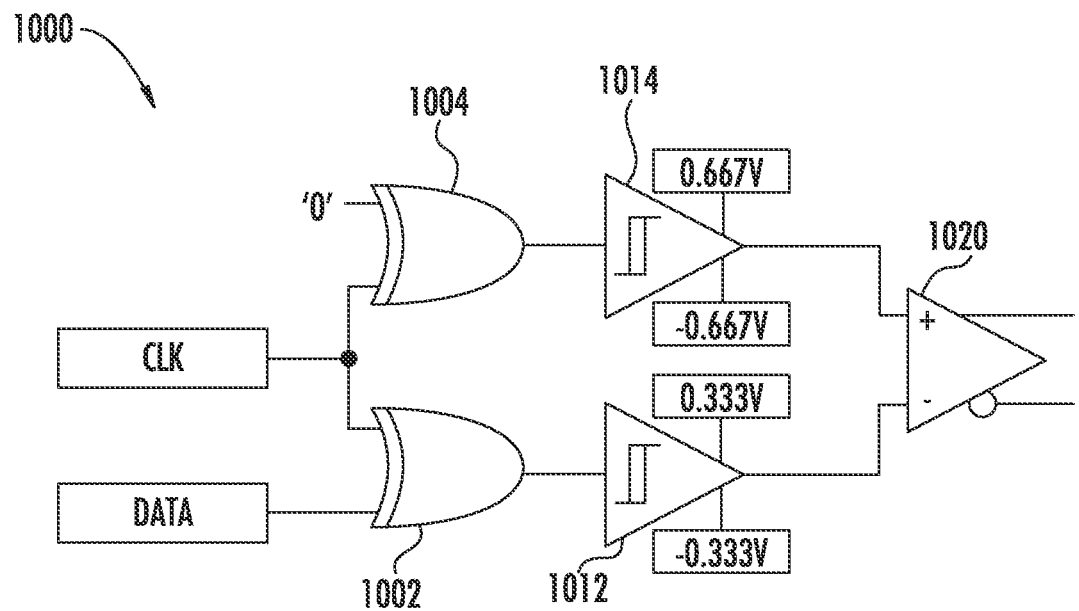
FIG. 10 is a schematic diagram of another embodiment of an encoder.

FIG. 10 is a schematic diagram of one embodiment of an encoder 1000. Encoder 1000 comprises a simple logic and voltage summing node that mixes the CLK and a Manchester encoded data signal to create the hybrid encoded signal. An XOR gate 1002 receives the CLK and data signals and output a Manchester encoded data signal. This signal is inputted to a zero crossing detector 1012 that converts the Manchester encoded data signal to a voltage level programmed signal. In this embodiment, zero crossing detector 1012 outputs a 0.333 V signal for a logic high input and −0.333 V signal for a logic low input.

Similarly, XOR gate 1004 outputs a signal to zero crossing detector 1014 based on the combination of a logic low signal and the CLK signal. Zero crossing detector 1014 outputs a 0.667 V signal for a logic high input and −0.667 V signal for a logic low input. Amplifier 1020 sums the signals from zero crossing detectors 1014 and 1012 together and outputs an amplitude modulated hybrid encoded data signal. The properties of the hybrid encoded data signal are such that a zero crossing is provided at each clock edge while maintaining full data integrity.

In this exemplary embodiment, the encoder 1000 has a 2:1 relationship of the encoded data scaling values of the zero crossing detectors 1014 and 1012, respectively, that provides good noise rejection. The absolute values of these factors may be chosen to provide a nominal 2 V peak-to-peak signal at each output (4 V peak-to-peak differential). Increasing this output swing further improve robustness when the receiver voltage swing is similarly scaled. The voltage swing at the receiver (for example, receiver 230) is smaller than that at the transmitter (for example, transmitter 210) and is determined by the ratio value of external capacitors (for example, the capacitors in FIG. 1).

Figure 11:
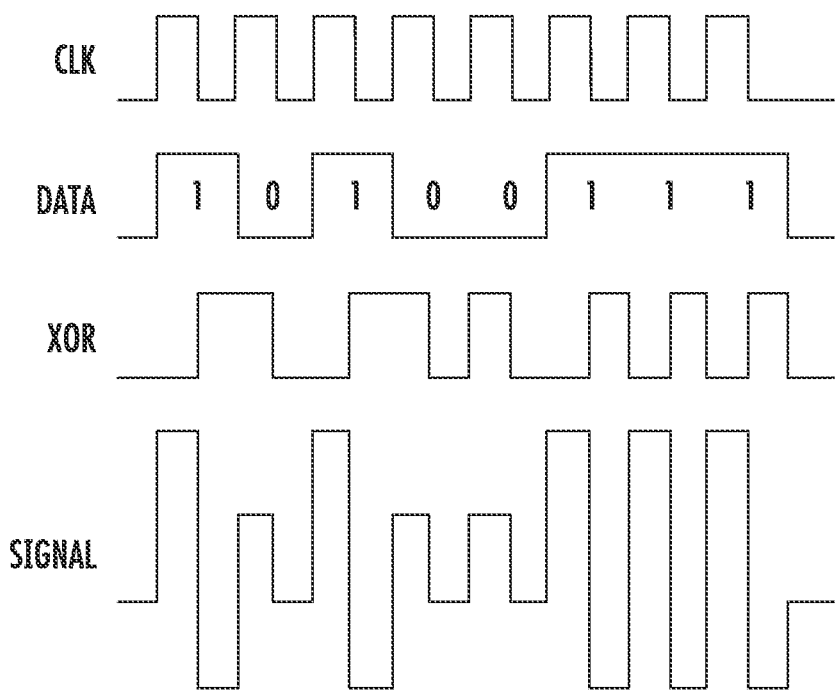
FIG. 11 is an exemplary timing diagram for the encoder of FIG. 10.

FIG. 11 shows the various signals associated with the encoder shown in FIG. 10. The XOR line is the Manchester encoded data outputted by the XOR gate 1002. The signal is the amplitude modulated hybrid encoded data signal that amplifier 1020 outputs.

Figure 12:
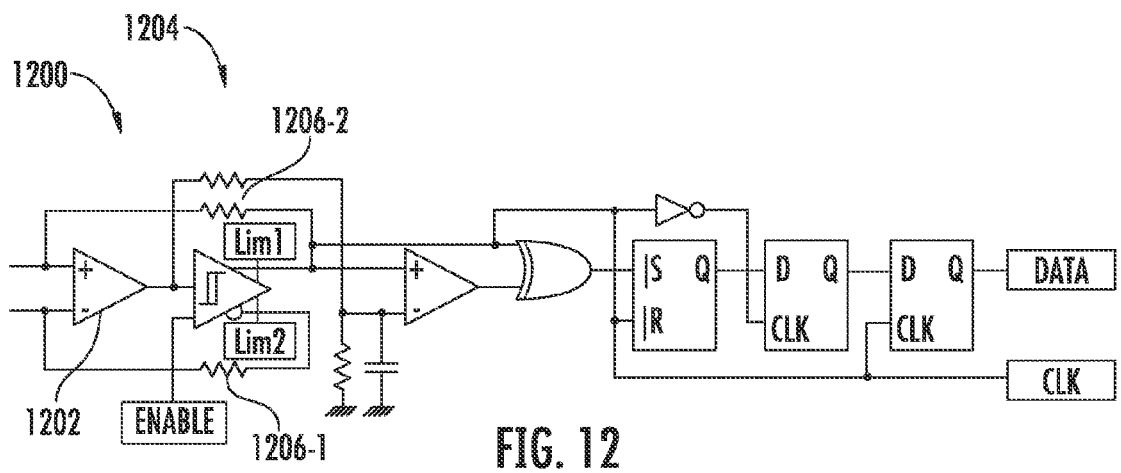
FIG. 12 is a schematic diagram of one embodiment of a decoder.

FIG. 12 is a schematic diagram of one embodiment of a decoder 1200. The decoder 1200 comprises a differential input stage 1202 followed by a limiting stage 1204 with differential outputs. Decoder 1200 provides load termination for the differential input signals at the nominal bus idle voltages. In one embodiment, the resistors 1206-1 and 1206-2 in decoder 1200 have nominally high values, for example, 100Ω. The limit values are the bus idle condition value at the receiver input and its compliment. An enable circuit detects the arrival of the first transmission edge and enables the limiting stage 1204. The limiting stage 1204 is disabled, such that the outputs conform to the bus idle condition following data transmission. The bus is always in the idle state at the end of a transmission. The enable circuit primarily provides the correct initial condition on device startup and also corrects any faulty bus idle conditions.

Figure 13:
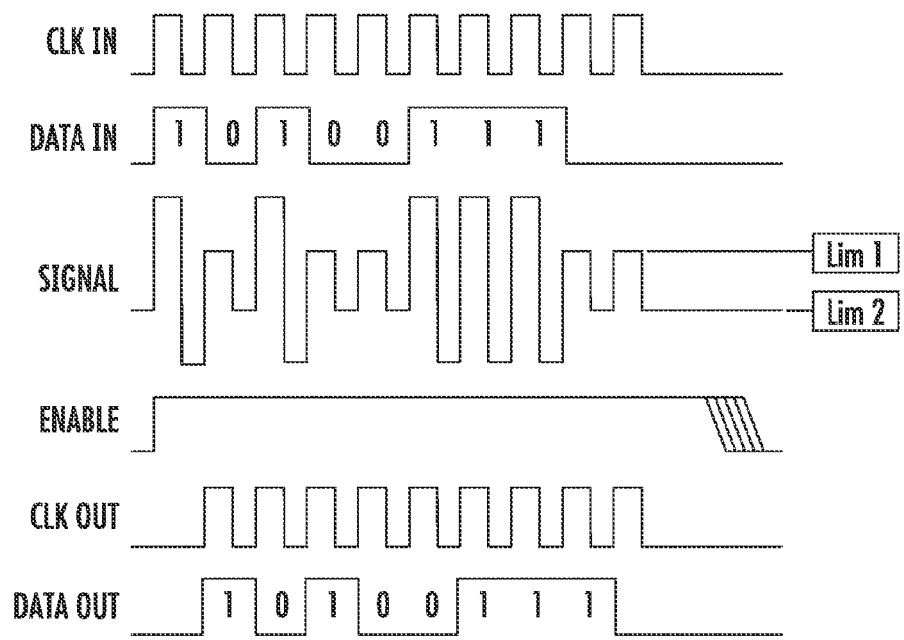
FIG. 13 is an exemplary timing diagram for the decoder of FIG. 12.

FIG. 13 is an exemplary timing diagram for the decoder of FIG. 12. Note that the output data signal is delayed by one clock cycle from the input signal. The source clock is extended by one clock cycle to facilitate decoding with the delayed data output. In this embodiment, all communication sequences are multiples of 8 bits.

Figure 14:
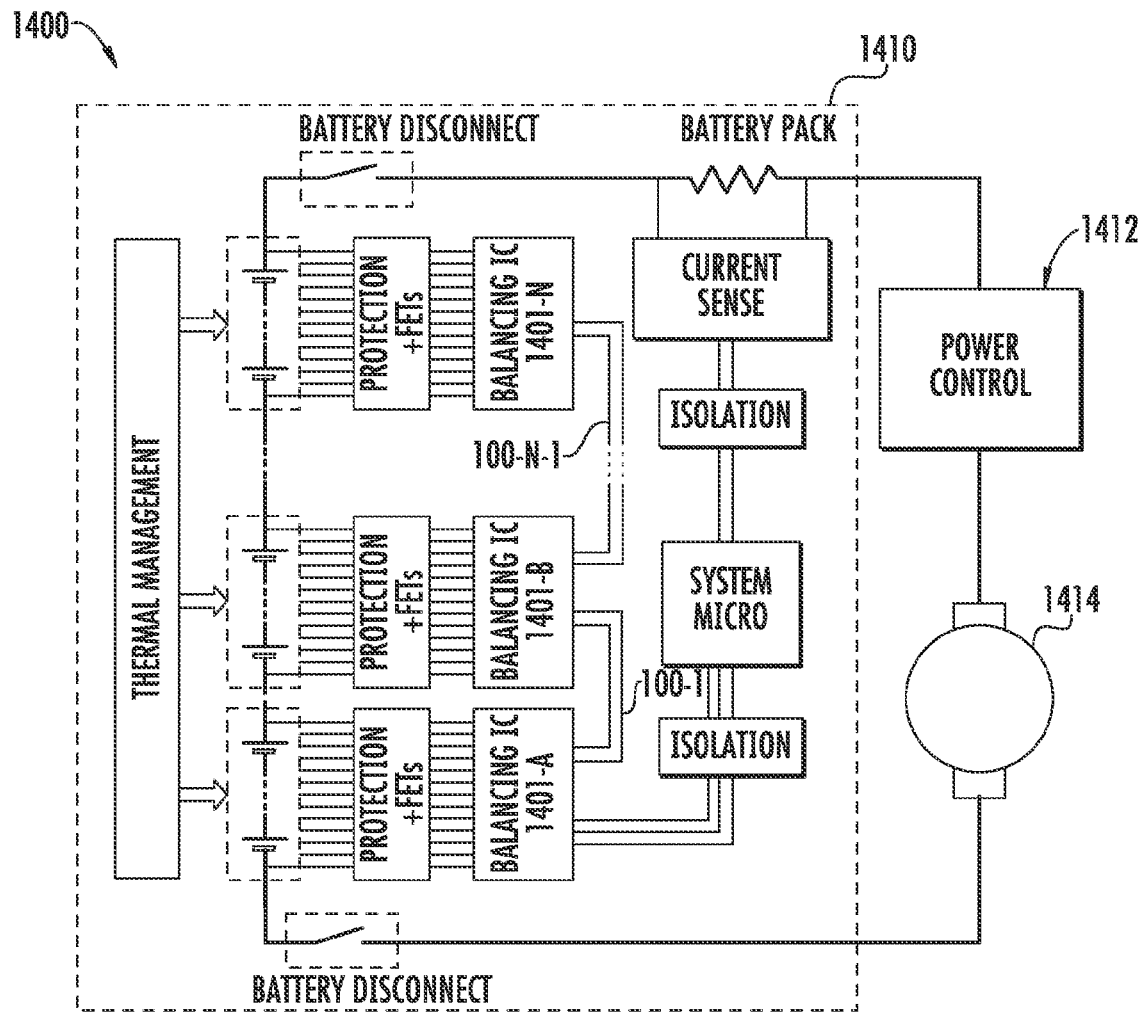
FIG. 14 is a block diagram of one embodiment of a battery.

FIG. 14 is a block diagram of one embodiment of an electrical system 1400. Electrical system 1400 comprises a Lithium (Li) ion battery pack 1410, a power control 1412, and a motor 1414. The Li-ion battery pack 1410 is adapted to include a number of balancing integrated circuits (ICs) 1401-A, 1401-B, to 1401-N, that are connected via a robust 2-wire daisy chain communications system. The balancing ICs monitor the cells in the battery 1410. The balancing ICs each comprise a transceiver and are connected in a daisy chain manner with communication systems 100-1 to 100-N−1.

One implementation of the electrical system 1400 is in a hybrid electric vehicle. In this embodiment, the battery pack 1410 is a high voltage battery system that handles up to 400 V. There is a balancing IC 1401 for each set of 12 battery cells that communicate through the daisy chain system described above. The difference in voltage between the top of the daisy chain and the bottom is 400 V, in levels of 40 V each. Due to the reactive nature of Lithium in the Li-ion battery 1410, there is a risk of explosion if the battery 1410 is overheated or overcharged. Embodiments of the isolated communications system described herein facilitate control against such explosions through the use of the monitoring and charge depletion functions of balancing ICs 1401.

Figure 15:
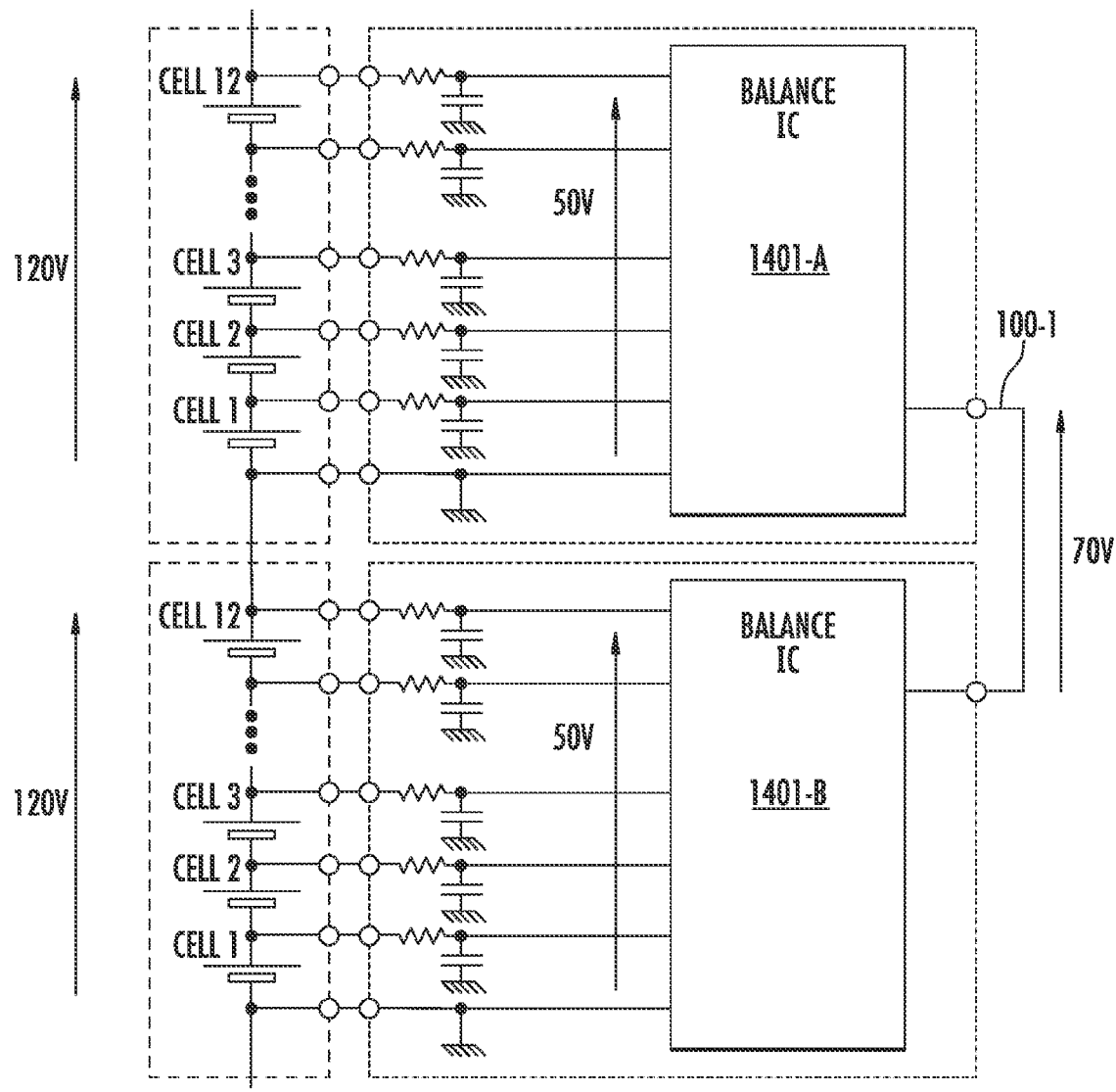
FIG. 15 is a block diagram of one embodiment of two cells of the battery of FIG. 14.

In another embodiment, the battery management system 1400 is installed in a gas-electric hybrid or electric vehicle. FIG. 15 provides more details of the connections between balance ICs 1401-A and 1401-B of FIG. 14 for a 12-cell system. If the voltage source is suddenly disconnected, an inductive spike could propagate through the battery pack 1410. The normal 40 V could spike to 120 V, and any connection between the balancing ICs 1401 sees a proportion of the spike. In one example, communication system 100-1 sees an instantaneous spike of 70 V. Because the communication system 100-1 is fully electrically isolated and protected against this level of voltage transient, the communication system 100-1 survive the transient without damage, and does not expose the electronics to dangerous voltage or temperature.

FIG. 16 is a flowchart of one embodiment of a method 1600 of transmitting data over an isolated communication system (for example, communication system 100). A data signal is received at a first transceiver, for example first transceiver 102 (block 1610). The first transceiver encodes the data signal (block 1620) and combines it with a clock signal to create a hybrid encoded data signal (block 1630). The first transceiver transmits the hybrid encoded data signal (block 1640). The hybrid encoded data signal is transmitted, for example, through the differential and AC coupling network that connects the first transceiver 102 to the second transceiver 104 through communications medium 106. The second transceiver receives the hybrid encoded data signal (block 1650). The second transceiver extracts the clock signal and decodes the data signal (block 1660). In one embodiment, the clock signal is extracted by detecting zero-crossings of the hybrid encoded data signal.

The embodiments described herein provide improved isolated communications, reducing EMI emissions and sensitivity, and increased transient voltage protection. Some embodiments provide a differential AC coupling network that rejects EMI at the receiver and divides the effects of transients between the ends of the communications medium. In one embodiment, an encoded data signal is combined with a clock signal to produce a hybrid signal that has a zero-crossing at every clock edge. The invention is not limited by the type of integrated circuit in which the present disclosure may be disposed. Nor is the invention limited to any specific type of process technology, e.g., CMOS, Bipolar, or BICMOS that may be used to manufacture the present disclosure. Other additions, subtractions or modifications are obvious in view of the present disclosure and are intended to fall within the scope of the appended claims.

A number of embodiments of the invention defined by the following claims have been described. Nevertheless, it will be understood that various modifications to the described embodiments may be made without departing from the spirit and scope of the claimed invention. Features and aspects of particular embodiments described herein can be combined with or replace features and aspects of other embodiments. Accordingly, other embodiments are within the scope of the following claims.

What is claimed is:

1. A communication system, comprising:
a first transceiver having a first and second port coupled to a communication medium, wherein the first port is coupled to a first line of the communication medium and the second port is coupled to a second line of the communication medium;
a second transceiver having a third and fourth port each AC coupled to the communication medium, wherein the third port is coupled to the first line of the communication medium and the fourth port is coupled to the second line of the communication medium, wherein a second transceiver having a third and fourth port AC coupled to the communication medium includes:
 a first AC coupling capacitor in series with a first resistive element coupling the third port to the first line of the communications medium; and
 a second AC coupling capacitor in series with a second resistive element coupling the fourth port to the second line of the communications medium;
a first capacitor coupled to the first port and ground;
a second capacitor coupled to the second port and ground;
a third capacitor coupled to the third port and ground; and
a fourth capacitor coupled to the second port and ground;
wherein the first and third capacitors are configured to form a first voltage divider with the first AC coupling capacitor, and the second and fourth capacitors are configured to form a second voltage divider with the second AC coupling capacitor, wherein the first, second, third, and fourth capacitors have values that are at least 30% of the values of the first and second AC coupling capacitors such that the first and second voltage dividers provide protection against transients.

2. The communication system of claim 1, further comprising:
a first differential capacitor coupled across the first and second ports; and
a second differential capacitor coupled across the third and fourth ports.

3. The communication system of claim 1, further comprising:
wherein the first transceiver comprises:
 a first transmitter that encodes and transmits data; and
 a first receiver that decodes received data; and
wherein the second transceiver comprises:
 a second transmitter that encodes and transmits data; and
 a second receiver that decodes received data.

4. The communication system of claim 1, wherein the first, second, third, and fourth capacitors have values that are about half the values of the first and second AC coupling capacitors.

5. The communication system of claim 2, further comprising:
a first resistive element in series at the first port between the first transceiver and the first differential capacitor;
a second resistive element in series at the second port between the first transceiver and the first differential capacitor;
a third resistive element in series at the third port between the second transceiver and the second differential capacitor; and
a fourth resistive element in series at the fourth port between the second transceiver and the second differential capacitor.

6. The communication system of claim 3, wherein the first and second transmitters encode data by Manchester encoding a data signal and clock signal and combining the encoded data with an amplified clock signal to form a hybrid encoded data signal.

7. The communication system of claim 3, wherein the first and second receivers decode data by extracting a clock signal and data signal from a hybrid encoded data signal.

8. The communication system of claim 6, wherein the hybrid encoded data signals have a zero crossing for each clock edge.

9. The communication system of claim 7, wherein the first and second receivers comprise:
a zero-crossing detector that extracts the clock signal from the hybrid encoded data signal;
an amplifier that amplifies the clock signal; and
a summing unit that sums the amplified clock signal and the data signal.

10. A daisy chain communication system, comprising:
a first communication system, comprising:
 a first transceiver having a first and second port coupled to a communication medium;
 a second transceiver having a third and fourth port each AC coupled to the communication medium, wherein a second transceiver having a third and fourth port AC coupled to the communication medium includes:
  a first AC coupling capacitor in series with a first resistive element coupling the third port to the communications medium; and
  a second AC coupling capacitor in series with a second resistive element coupling the fourth port to the communications medium;
 a first capacitor coupled between the first port and ground;
 a second capacitor coupled between the second port and ground;
 a third capacitor coupled between the third port and ground;
 a fourth capacitor coupled between the fourth port and ground;
 wherein the first and third capacitors are configured to form a first voltage divider with the first AC coupling capacitor, and the second and fourth capacitors are configured to form a second voltage divider with the second AC coupling capacitor, wherein the first, second, third, and fourth capacitors have values that are at least 30% of the values of the first and second AC coupling capacitors such that the first and second voltage dividers provide protection against transients;
 wherein the first transceiver comprises an encoder configured to encode a data signal, wherein the first transceiver combines the encoded data signal into a hybrid encoded data signal before transmission; and
 wherein the second transceiver comprises a decoder configured to extract a clock signal from the hybrid encoded data signal and resolve the data signal; and
a first device coupled to the first transceiver of the first communication system; and
a second device coupled to the second transceiver of the first communications system.

11. The daisy chain communication system of claim 10, further comprising:
   wherein the first device is a first battery cell and the second device is a second battery cell; and
   wherein the first and second battery cells are installed in a battery pack for use in an electric or gas-electric hybrid vehicle.

12. The daisy chain communication system of claim 10, further comprising:
   a third device coupled to a second transceiver of a second communication system; and
   wherein the second transceiver of the first communications system is a first transceiver of the second communication system.

13. The daisy chain communication system of claim 10, wherein the encoder is configured to combine the encoded data signal with an amplified clock signal to produce the hybrid encoded data signal such that the hybrid encoded data signal has a zero crossing for each clock edge.

14. The daisy chain communication system of claim 10, where the decoder includes:
   a zero-crossing detector that extracts the clock signal from the hybrid encoded data signal;
   an amplifier that amplifies the clock signal; and
   a summing unit that sums the amplified clock signal and the data signal.

15. The communication system of claim 10, wherein the first, second, third, and fourth capacitors have values that are about half the values of the first and second AC coupling capacitors.

16. A method of performing isolated communications, the method comprising:
   receiving a data signal at a first transceiver;
   encoding the data signal and a clock signal with an encoder to generate an encoded data signal;
   combining the encoded data signal with an amplified clock signal to generate a hybrid encoded data signal;
   transmitting the hybrid encoded data signal through a differential voltage capacitor network over a communications medium to a second transceiver.

17. The method of claim 16, further comprising:
   receiving the hybrid encoded data signal at the second transceiver; and
   decoding the hybrid encoded data signal into the clock signal and the data signal.

18. The method of claim 16, further comprising:
   providing the decoded data signal and the clock to a device coupled to the second transceiver.

19. The method of claim 16, wherein combining the encoded data signal with an amplified clock signal includes combining the encoded data signal combined with the amplified clock signal such that the hybrid encoded data signal has a zero crossing for each clock edge.

20. The method of claim 17, wherein decoding the hybrid encoded data signal includes:
   detecting zero-crossings to extract the clock signal from the hybrid encoded data signal;
   amplifying the clock signal; and
   summing the amplified clock signal and the data signal.

\* \* \* \* \*